United States Patent [19]
Bleiweiss et al.

[11] Patent Number: 5,768,551
[45] Date of Patent: Jun. 16, 1998

[54] INTER CONNECTED LOOP CHANNEL FOR REDUCING ELECTRICAL SIGNAL JITTER

[75] Inventors: Scott Bleiweiss, Upton; Brian Gallagher, Marlboro, both of Mass.

[73] Assignee: EMC Corporation, Hopkinton, Mass.

[21] Appl. No.: 536,154

[22] Filed: Sep. 29, 1995

[51] Int. Cl.$^6$ .................... G06F 11/16; H03K 17/16
[52] U.S. Cl. .................... 395/311; 395/566; 395/570; 395/281
[58] Field of Search .................... 395/280, 281, 395/311, 500, 872, 566, 570

[56] References Cited

U.S. PATENT DOCUMENTS

| | | | |
|---|---|---|---|
| 3,725,864 | 4/1973 | Clark et al. | 340/172.5 |
| 4,709,365 | 11/1987 | Beale et al. | 371/11 |
| 4,805,172 | 2/1989 | Barbe et al. | 370/68.1 |
| 4,807,184 | 2/1989 | Shelor | 364/900 |
| 5,058,004 | 10/1991 | Ravid | 364/200 |
| 5,072,378 | 12/1991 | Manka | 395/575 |
| 5,182,801 | 1/1993 | Asfour | 395/425 |
| 5,206,939 | 4/1993 | Yani et al. | 395/400 |
| 5,206,943 | 4/1993 | Callison et al. | 395/425 |
| 5,219,297 | 6/1993 | Stein et al. | 439/188 |
| 5,235,689 | 8/1993 | Baker et al. | 395/425 |
| 5,327,023 | 7/1994 | Kawana et al. | 307/465 |
| 5,349,343 | 9/1994 | Oliver | 340/825.52 |
| 5,510,946 | 4/1996 | Franklin | 361/56 |
| 5,578,940 | 11/1996 | Dillon et al. | 326/30 |

*Primary Examiner*—Thomas C. Lee
*Assistant Examiner*—Rehana Perveen
*Attorney, Agent, or Firm*—Fish & Richardson P.C.

[57] ABSTRACT

A fiber channel, interconnecting a plurality of disk drive loops and associated high speed bypass switches, has a selected group of high speed bypass switches to modularize the fiber channel and to reduce electrical signal jitter on the channel. More particularly, the fiber channel loop has a first group of bypass switches being connected to either connect an associated disk drive to the loop or to electrically isolate the loop from the associated disk drive, and a second group of the bypass switches is then connected, in a first operating state, to connect a group of disk drives and their respective associated bypass switches for electrical signal communications with disk drive controller, and in a second operating state, for electrically isolating the group of disk drives and their respective associated bypass switches from communications with the controller. The disk drives and their associated bypass switches can be modularly added to the fiber channel configuration by employing the second group of bypass switches as high speed controllable gateways.

14 Claims, 3 Drawing Sheets

INTER CONNECTED LOOP CHANNEL FOR REDUCING ELECTRICAL SIGNAL JITTER

The invention relates generally to methods and apparatus for communicating between disk drive controllers and the disk drives, and more particularly, to a method and apparatus for controlling jitter and providing modular expandability in fibre channel loops.

BACKGROUND OF THE INVENTION

Fibre channel is an interconnection technology which can be used as the back-end interconnection between disk controllers and disk drives. The fibre channel is a high-speed channel and relies on retiming of the signals on the channel to minimize and prevent read errors caused by accumulated channel jitter. A typical fibre channel loop used for disk drives is made up of a series of bypass switches which are used to either bypass disk drives which are inoperative or not installed, or to put the disk drive into the series communications loop path when the drive is in a ready state. Long chains of these switches, that is, a series connection of the switches without passing through a disk drive, will degrade the fibre channel signals by introducing jitter into the signals.

The fibre channel signals thus have a limit to the amount of jitter they can tolerate before the signal becomes unusable. The electrical signal must reach a fibre channel receiving node, (that is, typically, a disk drive receiving node) before the degradation cannot be reversed. One method of removing signal jitter is to place fibre channel repeaters every so often to retime the signals.

Another method to avoid the jitter problem is to restrict the disk loading locations and the minimum number of disks on the loop to ensure that the signals only have to go through a few bypass circuits (at worst) before being retimed by a disk drive. Yet another alternative is to provide modular drive expansion which routes the fibre channel on to cables between the disk drives and controllers. These external cables can be daisy chained between the disk drive cabinets as disk capacity is expanded while at the same time controlling and/or reducing jitter.

Accordingly, a primary object of the invention is a method and apparatus for operating a system with a large number of disk drives on a single fibre channel loop. Other objects of the invention include in a method and apparatus which no longer restrict the minimum number of disk drives on large fibre channel loops, which no longer need repeater circuits, and which provide a simpler design complexity resulting in lower cost and higher reliability, as well as modular expansion.

SUMMARY OF THE INVENTION

The invention relates to an interconnected fibre channel loop having a plurality of disk drives connected to at least one disk drive controller, and a fibre channel loop for interconnecting the controller to each of the disk drives. The fibre channel loop features a plurality of bypass switches, each switch in a first group of the bypass switches being connected to operate, in a first mode, to connect an associated disk drive to the loop and, in a second mode, to cause the loop to bypass the associated disk drive. Each bypass switch of a second group of the bypass switches, in a first operating state, connects a group of disk drives and their respective associated bypass switches (from the first group) for electrical signal communications with disk controller, and in a second operating state, electrically isolates, the group of disk drives and their respective associated bypass switches from communications with the controller.

In particular aspects of the invention, the bypass switches are high speed multiplexers, preferably, loop resiliency circuits (LRC's). The fibre channel can feature a circuitry wherein each group of disk drives and their associated bypass switches located further, electrically, than a group "closest to the controller" can represent a disk drive module; and each disk drive module will have associated with it a bypass switch of the second group of switches whereby the disk drives and bypass switches can be modularly added to the fiber channel configuration.

In a more general aspect of the invention, an interconnected loop channel for reducing electrical signal jitter features a plurality of channel devices, at least one channel management controller, and a channel loop for interconnecting each management controller to each plurality of channel devices. The loop features a plurality of bypass switches, each switch in a first group of the bypass switches being connected to either connect an associated channel device to the loop or to cause the loop to bypass the associated channel device. Each switch of a second group of the bypass switches (these bypass switches being called in this application the intermediate bypass switches) connects, in a first operating state, a group of the channel devices and their respective associated bypass switches for electrical signal communications with the channel management controller, and in a second operating state, the bypass switches electrically isolate the group of channel devices and their respected associated bypass switches from communications with the channel management controller.

BRIEF DESCRIPTION OF THE DRAWINGS

Other objects, features, and advantages of the described particular embodiments of the invention will be apparent from the drawings in which.

DESCRIPTION OF THE PREFERRED PARTICULAR EMBODIMENTS

The invention herein is directed specifically to fibre channel disk loops and the associated disk drive controllers and disk drives connected to it. However, the invention is also applicable to other types of electronic equipment which can be connected to a channel loop such as, for example, personal computers, work stations, and other electronic devices which have need to communicate on a channel loop. Nevertheless, however, in order to make the description clear, the description is directed to the application which embodies disk drives and disk drive controllers on a fibre channel loop.

Figure 1:
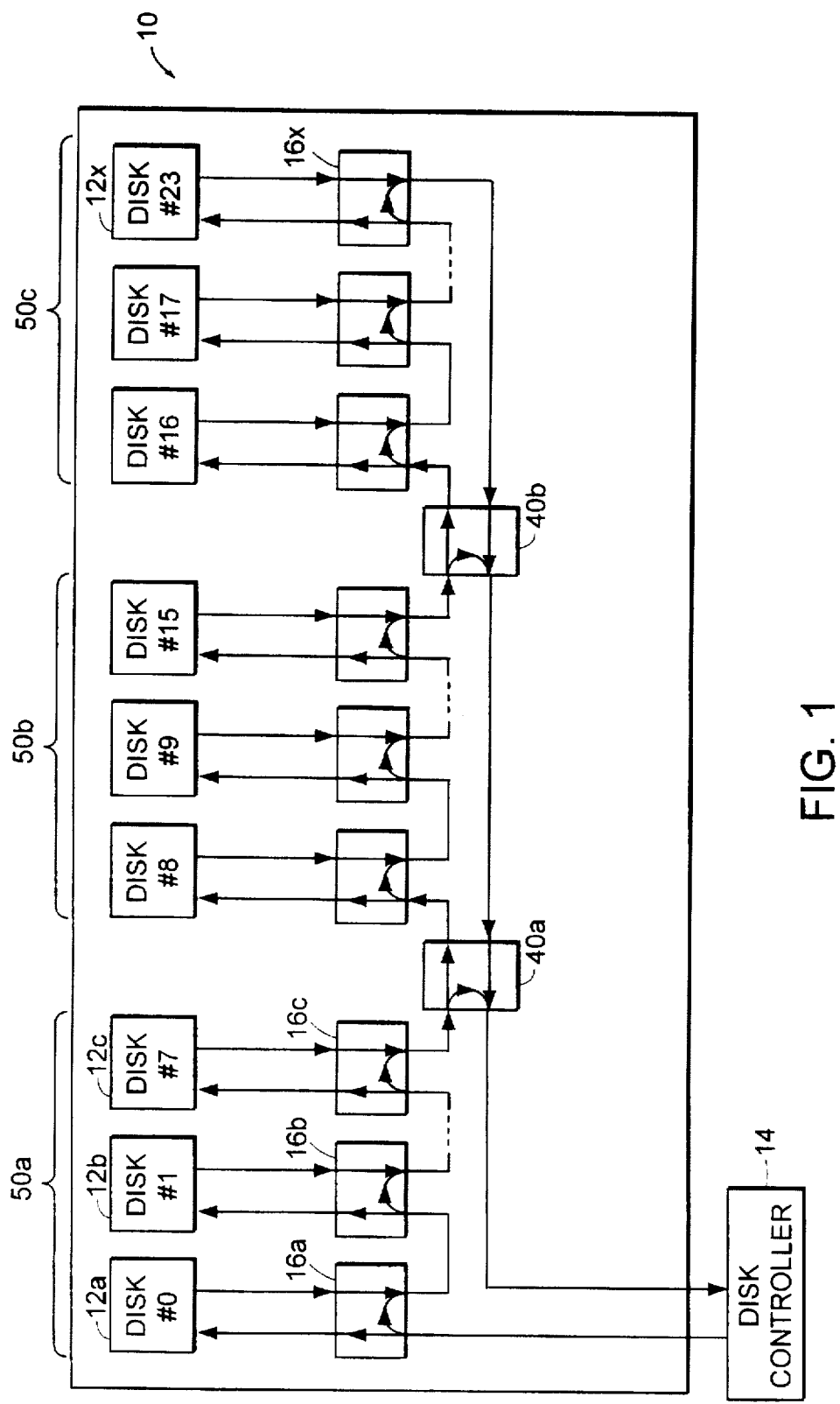
FIG. 1 is a block diagram of a typical fibre channel disk loop in accordance with the invention.

Referring to FIG. 1, a fibre channel disk loop 10 has a plurality of disk drives 12a, 12b, . . . , 12x each connected for electrical communications to a disk controller 14 through associated bypass switching elements 16a, 16b, . . . , 16x. The bypass switches, in a preferred embodiment of the invention, are loop resiliency circuits (LRC's) which act as a multiplexing switch.

Figure 2A:
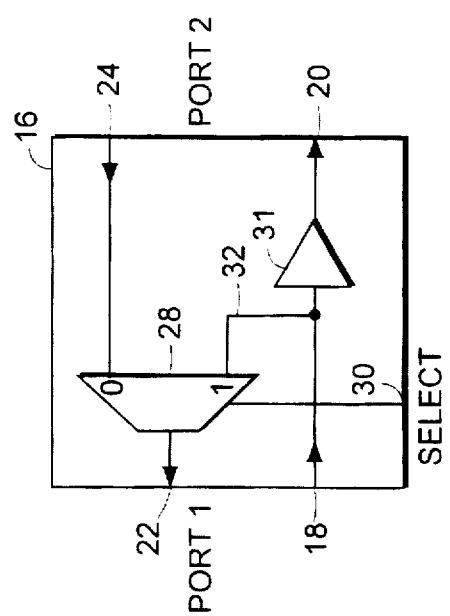
FIGS. 2A and 2B are more detailed schematic and logical diagrams, respectively, of LRC function in accordance with the invention.
Figure 2B:
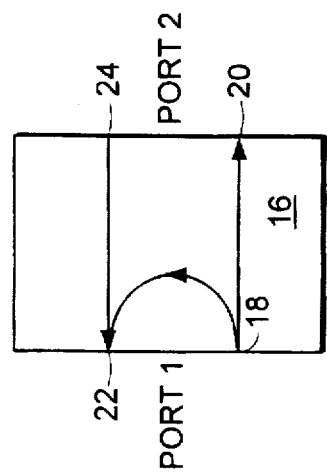

Referring to FIGS. 2A and 2B, there is illustrated, respectively, a schematic representation of the operation of an LRC (FIG. 2A) as well as its logical operation (FIG. 2B). In a first, through mode of operation, referring to FIG. 2B, an LRC 16 receives an input at an input port 18 and transmits it to an output port 20. In a second mode of operation, the LRC, in addition, transfers the input on line 18 to a second output port 22 which provides a bypass of all of the circuitry connected to port 2 of the switch. In this second, bypass mode of operation, any input signals appearing at port 2 on node 24 are ignored and are not passed through to node 22 of port 1.

Referring to FIG. 2A, an electrical schematic is provided in which a typical multiplexing device 28 operates in response to a select path switch line at node 30. At all times, the input at node 18 is passed through a noninverting amplifier 31 to node 20. However, depending upon the value of the select line at node 30, multiplexer 28 selects either the input from node 24 or the input available to it from node 18 over a line 32 and provides that selected input to the output, port 1, at node 22.

Referring again to FIG. 1, each of the disk drives 12 is interfaced to the fibre channel loop through an LRC 16. In the illustrated embodiment, each drive has a dedicated LRC associated with it so that the fibre channel loop will remain operable even though a disk drive fails to operate or is removed from its slot. The chains of LRC's under these circumstances, that is, operating in a bypass mode, can become quite long in those instances where many disk drives are either removed, fail, or the corresponding slot is not used because it is not necessary for the particular configuration.

Each LRC which is operated in a bypass mode introduces a small amount of jitter into the signals which pass through it. That jitter can thus accumulate, and if too great, causes reliability and accuracy problems which adversely impact the operation of the loop. The disk drives which are installed on the loop, and which are operative to receive signals from the loop, will retime the signal which it receives thus removing any jitter which has been accumulated up to that point.

Thus, the number of LRC's operating in a bypass mode must be limited to a reasonable number. This becomes more imperative at the higher operating frequencies of the fibre channel (1.062 GBaud) In accordance with the invention, this function is effected by placing intermediate bypass loop switches, that is, intermediate bypass LRC's, periodically along the disk fibre channel loop. These bypass LRC's, operating together with sequential disk loading on the chain, effectively prevent significant jitter accumulation on the loop.

Accordingly, in the illustrated embodiment of the invention, a plurality of intermediate bypass LRC's 40a, 40b, divide the fibre channel loop into logical segments. These segments are each self contained loops of fibre channel ports and a segment can operate whether the next successive segment, that is, the next segment further from the disk controller, such as segment 50b in comparison to segment 50a, is either operable or present. This allows for modularity within the fibre channel disk loop as segments can be added to, or removed from, the loop.

Figure 3:
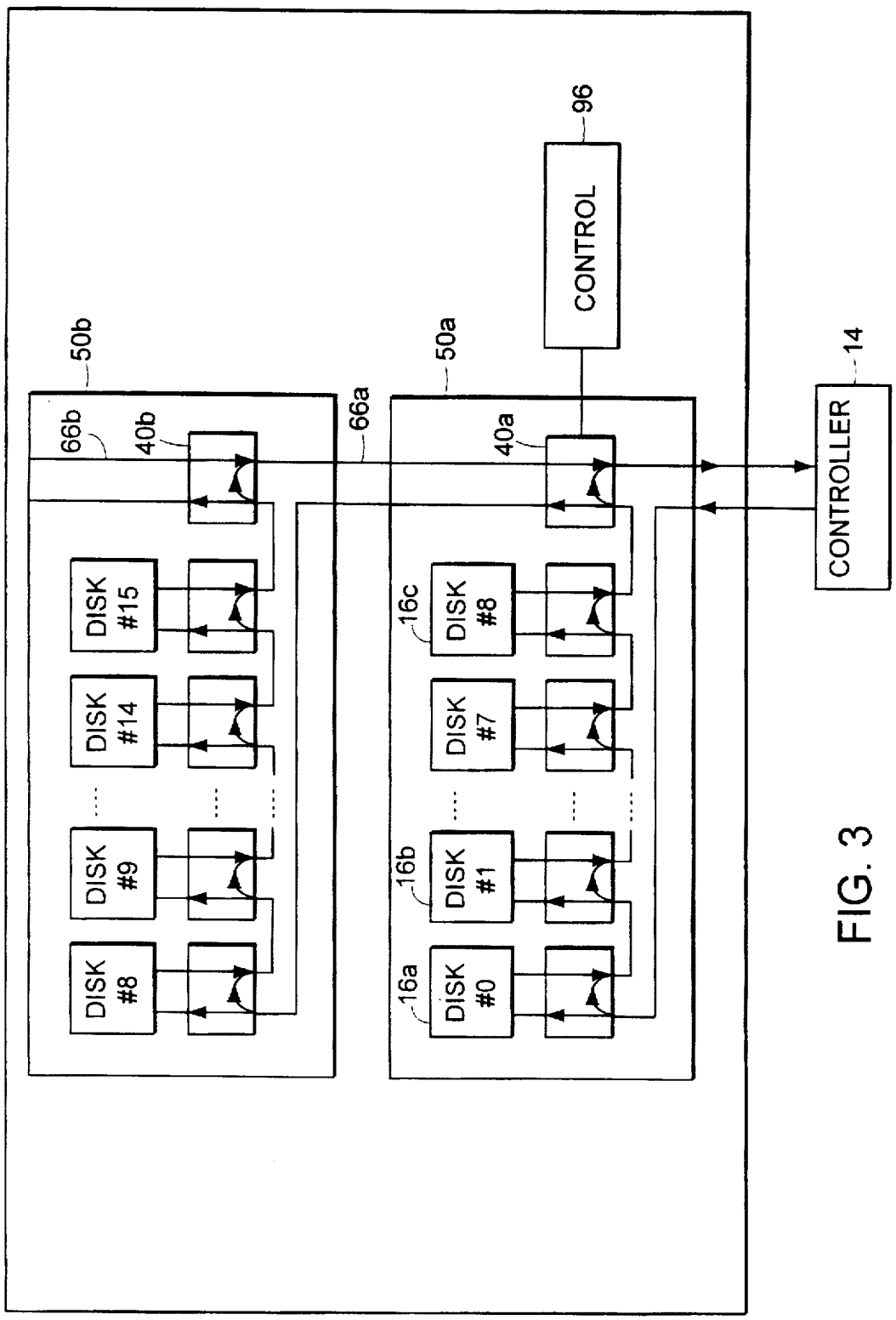
FIG. 3 is a schematic block diagram illustrating the modular expandability of a system in accordance with the preferred embodiment of the invention.

In operation, the bypass switches are used to bypass either unused or inoperative disk slots as shown in FIG. 1, and to provide modular expansion as provided by the intermediate bypass switches 40 as illustrated more clearly in FIG. 3. In one embodiment, the disk drives are added to the fibre channel loop beginning with disk slot zero and proceeding upwards in count. In the configuration illustrated in FIG. 1, there will never be more than eight successive bypassed LRC's in any configuration. If there is only a single disk installed in slot zero, the signal must propagate through the bypassed LRC's for slots one through seven (for example 16b, . . . , 16c), and then through the bypass intermediate LRC 40a located between slots 7 and 8 from which it returns back to the disk controller. When more than 8 disks are installed, the intermediate LRC 40a, between disk slots 7 and 8, is set to the through mode and disk slots 8–15 are added to the loop.

A further optimization can be made to reduce the number of bypassed LRC's which must be traversed. In accordance with this method, each disk subloop segment, that is, subloop 50a, 50b, 50c, is loaded from its middle. A single disk is thus installed first at slot 4 (as opposed to slot 0) which would require that only 4 bypassed LRC's are traversed as opposed to 8 when the first disk is loaded at disk slot 0. A nominal loading sequence, identified by slot numbers, could be; 4, 3, 5, 2, 6, 1, 7, 0. This sequence can be designed into the system so that the disk slots can be arranged physically in a simple left to right order.

Referring now to FIG. 3, there is illustrated an example of how the intermediate LRC's 40 can be employed to provide modular disk expansion of the fibre channel. The intermediate LRC's 40 segment the loop into smaller subloop segments 50, much as is illustrated in connection with FIG. 1. The subloops each contain an intermediate LRC if the number of disks supported by the subloop require it. An expansion port 66 can be employed as a box to box interconnect point as is desirable in the disk expansion subsystem. Thus, each module 50a, 50b can be added to the system, as needed, without adversely affecting the jitter characteristics of the resulting signals. This enables the system to be modularly expanded, to include, for example, an unlimited number of disk drives if necessary. The key is that as drives are needed (or not needed), the intermediate LRC's 40 can operate in response to a management controller 96 (which also connects to all of the other LRC's in order to properly set them to either the bypass mode or the through mode depending upon the status of the disk drive connected at that slot (or not connected at this slot) or segment without adversely affecting the jitter characteristics of the electrical signals on the line). Management controller 96 can be a disk drive controller or other available management device, such as a software driven processor system.

While the described and preferred embodiment has been illustrated using a fibre channel loop, other high speed, high reliability signalling protocols can be employed and the resulting degradation of the signals can be altered according to the method and structure of the claimed invention. Thus, additions, subtractions, and other modifications of the described particular embodiments of the invention will be apparent to those in this field and are within the scope of the following claims.

What is claimed is:

1. An interconnected loop channel for reducing electrical signal jitter comprising
a plurality of channel devices,
at least one channel management controller, and
a channel loop for interconnecting each said controller to each of said plurality of channel devices, said loop comprising
a plurality of bypass switches,
each switch in a first group of said bypass switches being connected to either connect an associated channel device to said loop or to cause said loop to bypass said associated channel device, and each switch of a second group of said bypass switches being connected, in a first operating state, to connect a group of said channel devices and their respective associated bypass switches for electrical signal communications with the channel management controller, and in a second operating state for electrically isolating said group of channel devices and their respective associated bypass switches from communications with said channel management controller which maintaining other channel devices in a loop channel.

2. The loop channel of claim 1 wherein said bypass switches are multiplexers and further comprising a control processor for controlling operation of said multiplexers.

3. The loop channel of claim 1 wherein said bypass switches are loop resiliency circuits.

4. An interconnected fibre channel loop for reducing electrical signal jitter comprising a plurality of disk drives, at least one disk drive controller, and a fibre channel loop for interconnecting each said controller to each of said plurality of disk drives, said loop comprising a plurality of bypass switches, each switch in a first group of said bypass switches being connected to either connect an associated disk drive to said loop or to cause said loop to bypass said associated disk drive, and each switch of a second group of said bypass switches being connected, in a first operating state, to connect a group of disk drives and their respective associated bypass switches for electrical signal communications with the disk controller, and in a second operating state for electrically isolating said group of disk drives and their respective associated bypass switches from communications with said controller which maintaining other disk drives in said fibre channel loop.

5. The fibre channel loop of claim 4 wherein said bypass switches are multiplexers and further comprising a management controller for controlling operation of said multiplexers.

6. The fibre channel loop of claim 4 wherein said bypass switches are loop resiliency circuits.

7. The fibre channel loop of claim 4 wherein each said group of disk drives and their associated bypass switches more distant in electrical communications than that group closest to the controller, comprise a disk drive module, and each disk drive module has associated with it a bypass switch of said second group designated an intermediate bypass switch, whereby disk drives and bypass switches can be modularly added to the fibre channel configuration.

8. The fiber channel loop of claim 7 wherein each group of disk drives has at least eight disk drive slots.

9. The fiber channel loop of claim 4 wherein said disk drives which are not bypassed have a series connection through said non-bypassing bypass switches.

10. The fibre channel loop of claim 4 further comprising disk slots for receiving said disk drives and said bypass switches being connected to said disk slots.

11. An interconnected fibre channel loop for reducing electrical signal jitter comprising a plurality of disk drives, at least one disk drive controller, and a fibre channel loop for interconnecting each said controller to each of said plurality of disk drives, said loop comprising a plurality of bypass loop resiliency circuits, each circuit in a first group of said bypass circuits being connected to either connect an associated disk drive in a series connection to said loop or to cause said loop to bypass said associated disk drive, and each circuit of a second group of said bypass circuits being connected, in a first operating state, to connect a group of disk drives and their respective associated bypass circuits for electrical signal communications with the disk controller, and in a second operating state, for electrically isolating said group of disk drives, and their respective associated bypass switches from communications with said controller while maintaining other disk drives in said fibre channel loop.

12. An interconnected channel loop communications method for reducing signal jitter comprising the steps of interconnecting a channel management controller to each of a plurality of channel devices in said channel loop through associated bypass switches, connecting, in a first mode, an associated channel device to said loop and bypassing, in a second mode, said associated channel device, connecting, in a first operating state, a group of channel devices and their respective associated bypass switches for electrical signal communications with the channel management controller, and electrically isolating, in a second operating state, said group of channel devices and their respective associated bypass switches from communications with said channel management controller while maintaining other channel devices in said channel loop.

13. An interconnected fibre channel communications method for reducing signal jitter comprising the steps of interconnecting a disk drive controller to each of a plurality of disk drive slots in said fibre channel loop through associated bypass switches, connecting, in a first mode, an associated disk drive slot to said loop and bypassing, in a second mode, said associated disk drive slot, connecting, in a first operating state, a group of disk drive slots and their respective associated bypass switches for electrical signal communications with the disk controller, and electrically isolating, in a second operating state, said group of disk drive slots and their respective associated bypass switches from communications with said controller while maintaining other disk drive slots in said fibre channel loop.

14. The communications method of claim 13 further comprising the step of adding disk drives to said disk drive slots in an order to minimize the maximum chain of first group bypass switches operating in said second mode.

* * * * *